United States Patent [19]
Nishijima et al.

[11] Patent Number: 5,955,219
[45] Date of Patent: Sep. 21, 1999

[54] LITHIUM NICKEL COPPER COMPOSITE OXIDE AND ITS PRODUCTION PROCESS AND USE

[75] Inventors: Motoaki Nishijima, Gose; Takehito Mitate, Yamatotakada, both of Japan

[73] Assignee: Sharp Kabushiki Kaisha, Osaka, Japan

[21] Appl. No.: 08/980,227

[22] Filed: Nov. 28, 1997

[30] Foreign Application Priority Data

Nov. 29, 1996 [JP] Japan .................................. 8-319400

[51] Int. Cl.⁶ .................................................. H01M 4/48
[52] U.S. Cl. ...................... 429/220; 429/223; 429/231.1; 423/641
[58] Field of Search .................................. 429/220, 223, 429/231.1; 423/593, 604, 641, 594

[56] References Cited

U.S. PATENT DOCUMENTS

| | | | |
|---|---|---|---|
| 5,378,560 | 1/1995 | Tomiyama .............................. | 429/217 |
| 5,576,121 | 11/1996 | Yamada et al. ......................... | 429/220 |
| 5,599,643 | 2/1997 | Plichta et al. ........................... | 429/220 |
| 5,670,227 | 9/1997 | Barker et al. ........................... | 429/220 |
| 5,759,719 | 6/1998 | Mao ........................................ | 429/223 |
| 5,804,335 | 9/1998 | Kamauchi et al. ..................... | 429/218 |

FOREIGN PATENT DOCUMENTS 6-111821  4/1994  Japan .
WO 90/10735  9/1990  WIPO .

OTHER PUBLICATIONS

Arai et al. Electrochemical and Structural Study. . ) Solid State Ionics, vol. 106, pp. 45–53, Feb. 1998.
Solid State Ionics. 44(1990)–87–97 This is referred to P.5 L.16–24 of the specification.
Solid State Ionics. 46 (1991) 243–247.
Journal of Solid State Chemistry 105(1993)410–416.
Patent Abstracts of Japan, bol. 095, No. 010, Nov. 30, 1995 & JP 07 192721 A (Sanyo Electric Co Ltd), Jul. 28, 1995.
Patent Abstracts of Japan, vol. 017, No. 608 (E–1457), Nov. 9, 1993 & JP 04 190177 A (Matsushita Electric Ind Co Ltd), Jul. 30, 1993.
Patent Abstracts of Japan, vol. 018, No. 414 (E–1587), Aug. 3, 1994 & JP 06 124707 A (Matsushita Electric Ind Co Ltd), May 6, 1994.

*Primary Examiner*—Maria Nuzzolillo
*Assistant Examiner*—Carol Chaney
*Attorney, Agent, or Firm*—Nixon & Vanderhye, P.C.

[57] ABSTRACT

A lithium nickel copper composite oxide having the compositional formula $Li_2Ni_{1-x}Cu_xO_2$ (0.0<X<1.0), which has a novel structure and enables the formation of a novel positive electrode active material having larger capacity than conventional ones, and further a secondary battery having large capacity by combining this novel positive electrode active material and a negative electrode active material made from a carbon material or the like.

11 Claims, 7 Drawing Sheets

Fig.8

LITHIUM NICKEL COPPER COMPOSITE OXIDE AND ITS PRODUCTION PROCESS AND USE

CROSS-REFERENCE TO RELATED APPLICATIONS

This application is related to Japanese application No. HEI 8(1996)-319400, filed on Nov. 29, 1996 whose priority is claimed under 35 USC § 119, the disclosure of which is incorporated by reference in its entirety.

BACKGROUND OF THE INVENTION

1. Field of the Invention

The present invention relates to a lithium nickel copper composite oxide and its production process and use. Especially, said composite oxide has the use as a positive electrode active material of a nonaqueous secondary battery which can be charged and discharged with a great capacity and has an excellent cycle characteristic.

2. Related Art

Recently, a secondary battery is often used as an electric power source of a portable electronic device in terms of economy. There are many kinds of secondary batteries. Among them, a nickel-cadmium battery is most popular now and recently a nickel-hydrogen battery is becoming popular. Meanwhile, a lithium secondary battery using lithium for an electrode produces high output voltage and has high-energy density. Therefore, the lithium secondary battery is practically utilized in some extent, and is now eagerly studied to improve its performance.

One of the materials for a positive electrode of the lithium secondary battery, which is commercially available now, is $LiCoO_2$. However, cobalt as the raw material of $LiCoO_2$ is expensive. Therefore, it is recognized that $LiNiO_2$ will be a good material for the positive electrode of the lithium secondary battery for next generation, because $LiNiO_2$ has the same crystallographic structure and shows almost the same electrochemical behaviors as $LiCoO_2$, and nickel as the raw material of $LiNiO_2$ is less expensive than cobalt.

It is known that $LiNiO_2$ is more stable than any other lithium nickel composite oxide and can be prepared relatively with ease. In the case where $LiNiO_2$ is used for the positive electrode active material of the nonaqueous secondary battery, lithium atoms are electrochemically deserted from the crystallographic structure as a result of charging.

Nickel exists in the state of $Ni^{3+}$ in the crystal of $LiNiO_2$. When lithium atoms are deserted from crystal of $LiNiO_2$, nickel is oxidized from 3+ into 4+. Maximum oxidation number of nickel is 4+ and $Ni^{4+}$ cannot be oxidized any more. Even if all lithium atoms are electrochemically drawn out from the crystal of $LiNiO_2$, the electrical capacity of the positive electrode never becomes more than one electron equivalent. Namely, the electrical capacity of the positive electrode is theoretically no more than 274.6 mAh/g.

However, when the lithium secondary battery using $LiNiO_2$ as the positive electrode active material is actually charged and discharged, the capacity of the positive electrode is around half of the above-mentioned theoretical capacity. Electrochemically, the capacity of the positive electrode can be up to about 70% to 80% of the above-mentioned theoretical capacity. However, in this case, the battery is so much deteriorated on its cycle characteristic and can be no more in practical use.

$LiNiO_2$ has so-called layer structure made from Li layers and Ni—O layers. When too much lithium atoms are electrochemically deserted from Li layers, the repulsion between Ni—O layers grows larger and destroys the crystallographic structure of $LiNiO_2$ itself. This is the reason for the above deterioration. In the case where lithium atoms are electrochemically deserted from the Li layers, nickel atoms from the Ni—O layers also fall into lithium sites and this causes the deterioration of the battery capacity.

There are many kinds of ways to overcome these disadvantages. However, the above phenomena come from the basic structure of $LiNiO_2$, so that it is impossible to find the fundamental way for overcoming these disadvantages. For the above-mentioned reasons, there are fundamental problems if the known lithium nickel composite oxide such as $LiNiO_2$ is used as the positive electrode active material of the secondary battery. Therefore, there has been a longing for a new positive electrode active material in order to provide the lithium secondary battery having excellent properties, especially large charge/discharge capacity.

As a negative electrode active material, on the other hand, usable are metallic lithium, lithium alloys (e.g., lithium aluminum or the like), carbon materials, substances which can be intercalated and deintercalated with lithium ions (e.g., conductive polymers such as polyacetylene, polythiophene, poly-p-phenylene or the like), transition metal oxides, transition metal sulfide, transition metal nitride, lithium transition metal oxide, lithium transition metal sulfide or lithium transition metal nitride. These materials may be used alone or as a composite thereof.

Among them, when metallic lithium or lithium alloy such as lithium aluminum is used as the negative electrode active material, the battery thereof has the great capacity per unit weight and high energy density. However, in this case, dendritical crystal, i.e., so-called dendrite appears and grows on the surface of the metallic lithium during the repeated charging and discharging processes. In a short time, the grown dendrite may contact the positive electrode to cause a short circuit within the battery or, in the worst case, a danger of firing.

Therefore, it is preferred that as the negative electrode active material for secondary battery used is the material which is not metallic lithium or lithium aluminum alloy and can be intercalated and deintercalated with lithium ions into the inside. Among them, it is thought that the carbon material is the most promising material in terms of energy density and price.

SUMMARY OF THE INVENTION

The present invention aims to provide a lithium nickel copper composite oxide which has a novel structure and enables to form a novel positive electrode active material having larger capacity than conventional ones, and further to provide a secondary battery having large capacity by combination of this novel positive electrode active material and a negative electrode active material made from a carbon material or the like.

Thus, the present invention provides the lithium nickel copper composite oxide having the compositional formula $Li_2Ni_{1-X}Cu_XO_2$ (0.0<X<1.0).

DETAILED DESCRIPTION OF THE PREFERRED EMBODIMENT

The present inventors have searched for new materials in place of conventional LiNiO$_2$ in order to achieve the above-mentioned object. In order to desert the lithium and/or other alkaline metal from the crystal thereby and generate more chemical energy from that, it is necessary to dessert more lithium or alkaline metal atoms from the crystal.

However, if too much of elements which construct a crystal structure is deserted, the crystal structure becomes to collapse, thereby, causing the decrease of the capacity. To prevent this, at first the crystal containing a lot of lithium or alkaline metal atoms should be prepared. Then, when some of lithium or alkaline metal atoms are deserted from that crystal, the collapse of the crystal does not occur and the electrode material with high energy density would be obtained. Therefore, the present inventors expected that such crystal could overcome the problem caused by using the known lithium nickel composite oxide as the positive electrode active material of the secondary battery such as the above-mentioned LiNiO$_2$.

With this point in mind, the present inventors examined various kinds of compounds and have found that the novel lithium nickel copper composite oxide, represented by Li$_2$Ni$_{1-x}$Cu$_x$O$_2$ (0.0<X<1.0) that has a completely different structure from LiNiO$_2$, can be prepared in a solid phase reaction and is very promising electrode material.

Li$_2$Ni$_{1-x}$Cu$_x$O$_2$ (0.0<X<1.0) of the present invention is believed to be novel compound which is a solid solution prepared from known composite oxide Li$_2$NiO$_2$ (H. Rieck et al., Z. Anorg. Allg. Chem., 392 (1972) 193.; J. R. Dahn et al., Solid State Ionics, 44 (1990) 87.; I. Davidson et al., Solid State Ionics, 46 (1991) 243; I. J. Davidson et al., Solid State Chem., 105 (1993) 410) and known composite oxide Li$_2$CuO$_2$ (T. A. Hewston et al., J. Phys. Chem. Solid, 48 (1987) 97.; JPA No. 6 (1994)-111821; Takeda et al., 35th Battery Conference 2C17; Arai et al., 35th Battery Conference 2C18).

Originally, lithium atoms exist in an amount more than two times as that of nickel atoms in Li$_2$Ni$_{1-x}$Cu$_x$O$_2$ (0.0<x<1.0) structure of the present invention. Nickel and copper can assume 2+ to 4+ valence number which is an average valence for nickel or copper. Therefore, there is possibility that up to two of lithium atoms can be deserted electrochemically from the crystal of Li$_2$Ni$_{1-x}$Cu$_x$O$_2$ (0.0<x<1.0).

Provided that the compositional formula is Li$_2$Ni$_{0.5}$Cu$_{0.5}$O$_2$ (x=0.5), the capacity of about 250 mAh/g is theoretically obtained by desertion of one lithium atom from the crystal and the large capacity of about 500 mAh/g by desertion of two lithium atoms. In the case of LiNiO$_2$, when lithium atoms are completely deserted from the crystal, the theoretical capacity is 275 mAh/g. Practically, however, only half of this is obtainable. In the case of Li$_2$Ni$_{1-x}$Cu$_x$O$_2$ (0.0<x<1.0) of the present invention, the large capacity of almost 250 mAh/g can be practically obtained even when the capacity is only half of the theoretical one obtained by drawing out lithium atoms completely.

Figure 1:
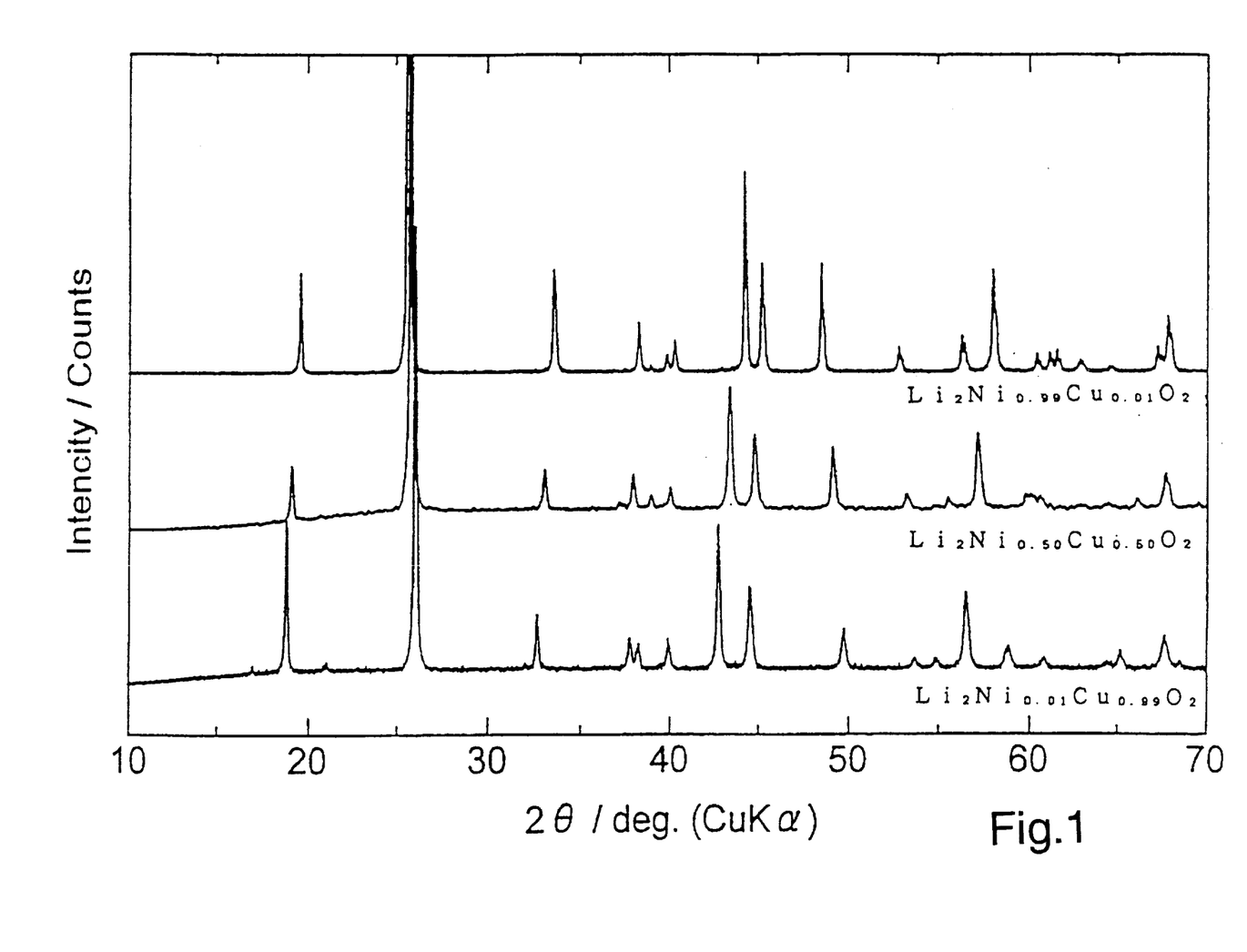
FIG. 1 shows a graphic representation showing a powder X-ray diffraction patterns of $Li_2Ni_{1-x}Cu_xO_2$ (x=0.01, 0.50, 0.99) in accordance with the present invention.
Figure 2:
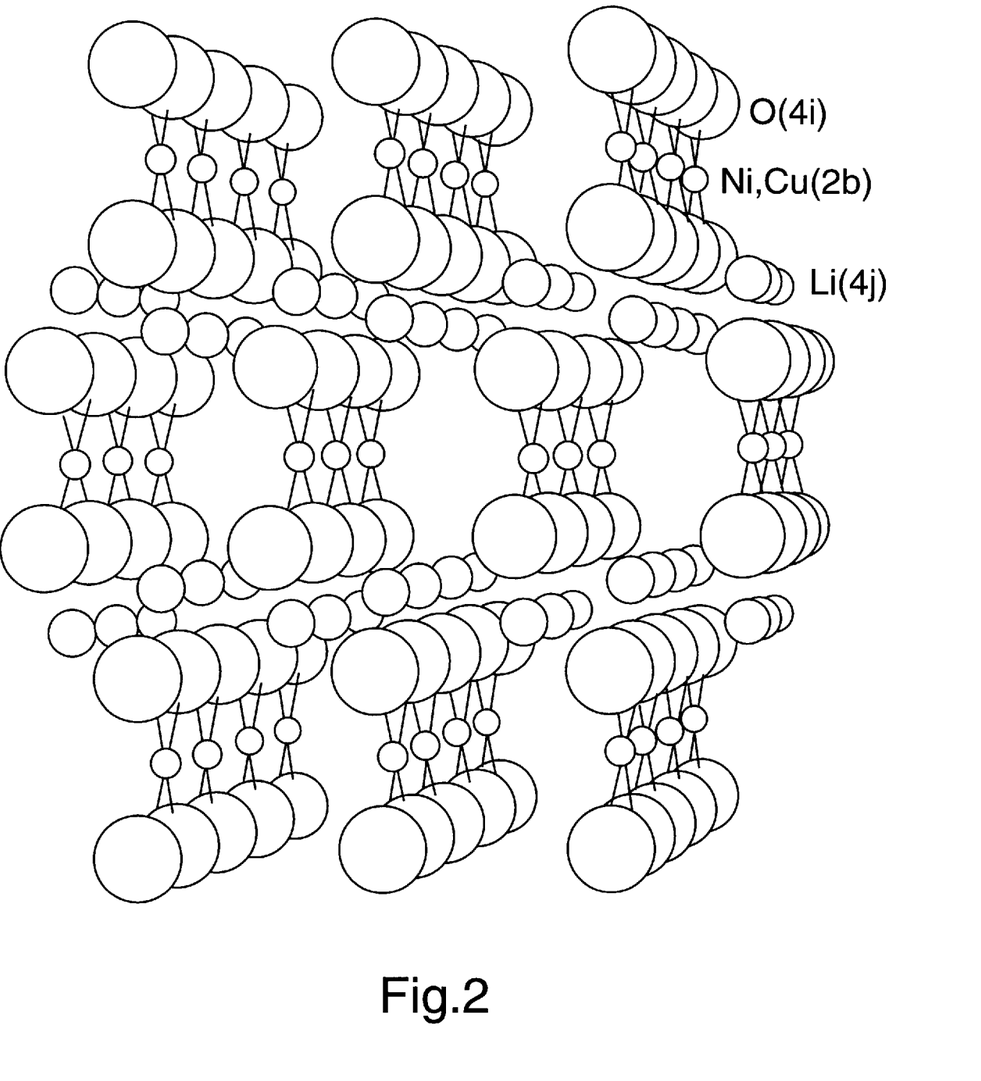
FIG. 2 shows a basic structure of $Li_2Ni_{1-x}Cu_xO_2$ (0.0<x<1.0) in accordance with the present invention.

The identify of Li$_2$Ni$_{1-x}$Cu$_x$O$_2$ (0.0<x<0.99) of the present invention were performed by the powder X-ray diffraction measurement that use CuK$\alpha$ radiation coming form enclosed X-ray tube. In the case that the ratios of lithium atom, nickel atom and copper atom of the starting materials are 2.0:0.99:0.01, 2.0:0.5:0.5 and 2.0:0.01:0.09, the X-ray diffraction patterns were obtained as shown in FIG. 1. From the structural refinement of these X-ray diffraction patterns, it is cleared that Li$_2$Ni$_{1-x}$Cu$_x$O$_2$ (0.0<x<1.0) of the present invention belongs to the space group I mmm and that in the structure lithium occupies the 4i site, nickel and copper occupy the 2b site and oxygen occupies the 4i site. FIG. 2 shows the basic structure of Li$_2$Ni$_{1-x}$Cu$_x$O$_2$ (0.0<x<1.0) in accordance with the present invention.

Figure 3:
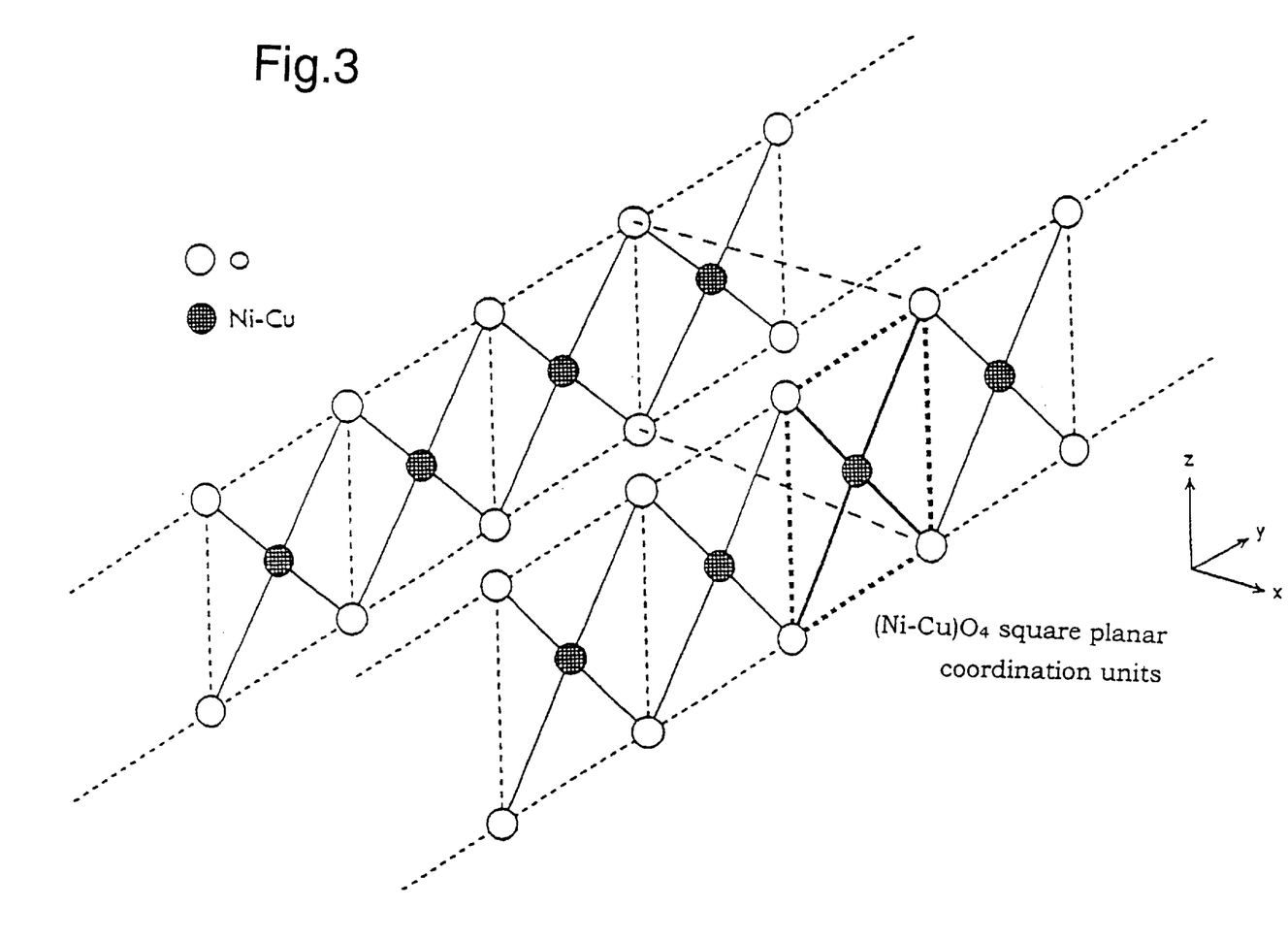
FIG. 3 shows a model structure of (Ni—Cu)O$_4$ square planar coordination units.

Li$_2$Ni$_{1-x}$Cu$_x$O$_2$ (0.0<x<1.0) of the present invention has structure such that (Ni—Cu)O$_4$ square planar coordination units has nickel or copper as the center atom and oxygen as the corner atom, (Ni—Cu)O$_4$ square planar coordination shares their opposite sides to form a linear chain; and the chains located parallel to another linear chain of (Ni—Cu)O$_4$ square planer coordination units with their planes facing opposite to each other to form a kind of layers ((Ni—Cu)O$_4$ layers). FIG. 3 shows the configuration in this structure.

Lithium atoms exist between one (Ni—Cu)O$_4$ layer and another (Ni—Cu)O$_4$ layer. More precisely, the positional relationship between the lithium atoms and the oxygen atoms of (Ni—Cu)O$_4$ layers is that the lithium atom corresponds to the center of tetrahedron sites having four oxygen atoms at each vertex. Namely, it can be said that the LiO$_4$ tetrahedron layer is formed. On the other hand, in the case of LiNiO$_2$, lithium atoms exist between NiO$_6$ layers, so that it can be said that the LiO$_6$ octahedral structure is formed considering the relationship between the positions of oxygen atoms and these of lithium atoms. As is apparent from the example of the tetrahedral site and the octahedral site in the spinel structure, lithium atoms can be diffused easier in the tetrahedral site than in the octahedral site. Therefore, it can be expected that lithium atoms can be diffused easily in Li$_2$Ni$_{1-x}$Cu$_x$O$_2$ (0.0<x<1.0) of the present invention than in LiNiO$_2$, so that Li$_2$Ni$_{1-x}$Cu$_x$O$_2$ (0.0<x<1.0) can produce improved charge-discharge characteristics with higher current.

For preparing Li$_2$Ni$_{1-x}$Cu$_x$O$_2$ (0.0<x<1.0) of the present invention, used are one or more of lithium compound(s) selected from the group consisting of metallic lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate, one or more of nickel compound(s) selected from the group consisting of nickel acetate, nickel amidosulfate, ammonium nickel(II) sulfate (hexahydrate), nickel benzoate, nickel bromide, basic nickel carbonate, nickel carbonyl compound, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel(II) oxide, dinickel trioxide, nickel perchlorate, nickel phosphate, nickel phosphinate, nickel pyrophosphate, nickel stearate, nickel sulfate, nickel sulfide, nickel tartrate and metal nickel, and one or more of copper compound(s) selected from the group consisting of copper acetate, copper benzoate, copper(I) iodide, copper(II) iodide, basic copper carbonate, copper(I) chloride, copper(II) chloride, copper citrate, copper cyanide, ammonium copper(II) chloride, copper diphosphate, copper (I) fluoride, copper(II) fluoride, copper formate, copper gluconate, copper hydroxide, copper methanolate, copper nitrate, copper sulfate, copper tartrate, copper oxalate, copper(I) oxide, copper(II) oxide, copper nitride, copper phosphide, copper pyrophosphate, copper salicylate, copper stearate and copper bromide.

These three kinds of compounds, i.e., the lithium compound, the nickel compound and the copper compound are mixed so as to make the molar ratio of lithium atom in the lithium compound:metal atom (nickel+copper) in the nickel compound and the copper compound 2.0:1.0 to 2.5:1.0 and to make the molar ratio of nickel atom in the nickel compound:copper atom in the copper compound 0.99:0.01 to 0.01:0.99. This mixture is calcined to give $Li_2Ni_{1-x}Cu_xO_2$. When x of $Li_2Ni_{1-x}Cu_xO_2$ is an arbitrary value in the range of 0<x<1, it is possible to prepare the single phase of $Li_2Ni_{1-x}Cu_xO_2$ (0.0<x<0.99).

The calcination temperature is in the range between 400° C. and 750° C. When the calcination temperature is too low, it is necessary to calcine for a longer time to get the single phase. On the contrary, when the calcination temperature is too high, a lot of lithium atoms are lost from the mixture due to evaporate that cause the costs increase. Namely, the calcination temperature is preferably in the range between 400° C. and 750° C.

The calcination can be carried out in the atmosphere of mixed gases of oxygen and the inert gas. Usable inert gas is one or more gas(es) selected from the group consisting of nitrogen, helium, neon, argon and krypton. Up to 0.1% of $H_2O$ and/or $CO_2$ contained in the inert gas as impurities does not affect the calcination. When the partial pressure of oxygen in the calcination atmosphere is in the range of 0.0% to 5.0% of the total pressure, it is possible to get the single phase of $Li_2Ni_{1-x}Cu_xO_2$ (0.0<x<0.99). If the partial pressure of oxygen is higher than 5.0% of the total pressure, the mixture of $Li_2Ni_{1-x}Cu_xO_2$ (0.0<x<0.99) and some impurities that have similar structure of $LiNiO_2$ was obtained.

The nickel compound and the copper compound can be selected from the various compounds cited above. In the case of using nickel oxide and copper oxide, the calcination time can be shortened. More precisely, in that case, the calcination time can be a relatively short period like an hour for giving the single phase of $Li_2Ni_{1-x}Cu_xO_2$ (0.0<x<1.0). However, in the case of using other compounds except the combination of nickel oxide and copper oxide, the calcination time would be more than 10 hours to obtain the single phase layer of $Li_2Ni_{1-x}Cu_xO_2$ (0.0<x<1.0).

The X-ray diffraction pattern of thus obtained $Li_2Ni_{1-x}Cu_xO_2$ (0.0<x<0.99) that use CuKα radiation coming from enclosed X-ray tube is measured. The X-ray diffraction pattern has peaks in the ranges of 2θ between 18.5° and 20.0, between 25.5° and 26.3°, between 32.0° and 34.0°, between 37.0° and 38.0°, between 38.0° and 40.0, between 39.0° to 40.6°, between 42.0° and 44.6°, between 44.0° and 46.0° and between 48.0° and 50.0°.

The nonaqueous secondary battery can be constituted by the combination of a positive electrode containing $Li_2Ni_{1-x}Cu_xO_2$ (0.0<x<1.0) of the present invention as positive electrode active material, a negative electrode containing metallic lithium or lithium intercalation and deintercalation substance as negative electrode active material and an ion-conductive material. At first, powders of $Li_2Ni_{1-x}Cu_xO_2$ (0.0<x<1.0) as the positive electrode active material are mixed with a electron conducting material, a binder and, if necessary, a solid electrolyte. Examples of the electron conducting material to be used include carbon materials such as acetylene black, graphite powder or the like, powdery metals and electrically conductive ceramic, but are not limited thereto.

As the binders used are fluoropolymers such as polytetrafluoroethylene, polyvinylidene fluoride or the like and olefin polymers such as polyethylene, polypropylene or the like, but are not limited thereto. The mixing ratio is preferably 1 part to 50 parts by weight of the conductive material and 1 part to 50 parts by weight of the binder with respect to 100 parts by weight of the lithium nickel copper composite oxide.

If the ratio of the conductive material is less than 1 part by weight, the electrical resistance or polarization of the resulting positive electrode is increased to reduce the discharge capacity of the positive electrode, so that a practical secondary battery cannot be fabricated. If the ratio of the conductive material is greater than 50 parts by weight, the amount of lithium nickel copper composite oxide contained in the positive electrode is reduced, so that the discharge capacity of the resulting positive electrode is reduced and the battery is no more in practical use.

If the ratio of the binder is less than 1 part by weight, the binding ability is lost and the positive electrode cannot be formed into shape. If the ratio of the binder is greater than 50 parts by weight, the electrical resistance or polarization of the positive electrode is increased and the amount of lithium nickel copper composite contained in the resulting positive electrode is reduced, so that the discharge capacity of the battery using the resulting positive electrode is reduced and the battery is no more in practical use.

The positive electrode can be prepared by contact-bonding the above mixture to a collector, or applying a slurry of the above mixture in a solvent such as N-methyl-2-pyrrolidone or the like to a collector followed by drying. Usable collectors are electron conducting materials such as metal foils, metal meshes and metal non-woven cloths or the like, but the quality and the shape of the collectors are not limited thereto.

As the negative electrode active material, usable are metallic lithium, lithium alloy (such as lithium aluminum), lithium intercalation/deintercalation materials such as conductive polymers (e.g., polyacetylene, polythiophene, poly-p-phenylene, etc.), carbon materials (e.g., carbon materials pyrolyzed in a gas phase in the presence of a catalyst, etc.) or graphite materials (e.g., natural graphite, synthetic graphite, expanded graphite, etc.) and inorganic compounds (e.g., tungsten dioxide, molybdenum dioxide, etc.). These materials may be used alone or as a composite thereof.

The negative electrode can be prepared by contact-bonding the negative electrode active material to a collector, or applying to a slurry of these in a solvent such as N-methyl-2-pyrrolidone or the like to a collector followed by drying. Usable collectors are electron conducting materials such as metal foils, metal meshs and metal non-woven cloths, but the quality and the shape of the collectors are not limited thereto.

Moreover, as the ion-conductive material to be used for the nonaqueous secondary battery of the present invention are organic electrolytes, polymeric solid electrolytes, inorganic solid electrolytes, molten salts or the like. And it is preferred to use the above-mentioned ion-conductive material, i.e., the electrolyte dissolved in an organic solvent.

Examples of the organic solvents to be used are esters (e.g., propylene carbonate, ethylene carbonate, butylene carbonate, diethyl carbonate, dimethyl carbonate, methylethyl carbonate, γ-butyrolactone, methyl formate and methyl acetate), tetrahydrofuran, substituted hydrofuran (e.g., 2-methyltetrahydrofuran), ethers (e.g., dioxolane, diethyl ether, dimethoxyethane, diethoxyethane and methoxyethoxyethane), dimethylsulfoxide, sulfolane, methylsulfolane, acetonitrile and the like. These organic solvents may be used alone or in combination.

Examples of the electrolytes are lithium salts, i.e., lithium perchlorate, lithium borofluoride, lithium phosphorofluoride, lithium hexafluoroarsenate, lithium trifluoromethane sulfonate, lithium halides, lithium chloroaluminate and the like. These electrolytes may be used alone or in combination.

The organic solvent and the electrolyte are not limited to these cited above. The organic electrolytic solution is preferably used after being dehydrated over activated aluminum, metallic lithium, etc. The content of water in the electrolytic solution is preferably 1,000 ppm or less, more preferably 100 ppm or less. In the alternative way, a dehydrated organic solvent and/or electrolyte may be used instead of dehydrating the organic electrolytic solution.

The nonaqueous secondary battery of the present invention may be prepared by connecting the above-mentioned positive electrode and the collector with a first external terminal, by connecting the above-mentioned negative electrode and the collector with a second external terminal and then by interposing the above-mentioned ion-conductive material between these electrodes (the positive electrode and the negative electrode). A separator such as porous polyethylene, porous polypropylene or the like may also be interposed between these electrodes together with the ion-conductive material, if necessary. The quality and the shape of the separator are not limited thereto.

Moreover, to prevent the first external terminal connected with the positive electrode and the second external terminal connected with the negative electrode from contacting each other, it is preferred that these external terminals are packed or hermetic sealed with polypropylene, ethylene or the like. These processes to prepare the battery are preferably carried out in an atmosphere of an inert gas or extremely dry air to prevent moisture from penetrating. Examples of the shape for the nonaqueous secondary battery of the present invention are, i.e., cylinder, button, square, sheet and the like, but are not limited thereto.

In accordance with an aspect of the present invention, there is provided the novel lithium nickel copper composite oxide having the compositional formula $Li_2Ni_{1-x}Cu_xO_2$ (0.0<x<1.0). To shorten the calcination time, it is preferred to use nickel oxide and copper oxide for its metal materials.

According to the present invention, the lithium nickel copper composite oxide, $Li_2Ni_{1-x}Cu_xO_2$ (0.0<x<1.0) may be prepared easily by mixing one or more of lithium compound(s) selected from the group consisting of metallic lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate; one or more of nickel compound(s) selected from the group consisting of nickel acetate, nickel amidosulfate, ammonium nickel(II) sulfate (hexahydrate), nickel benzoate, nickel bromide, basic nickel carbonate, nickel carbonyl compound, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel(II) oxide, dinickel trioxide, nickel perchlorate, nickel phosphate, nickel phosphinate, nickel pyrophosphate, nickel stearate, nickel sulfate, nickel sulfide, nickel tartrate and metal nickel; and one or more of copper compound(s) selected from the group consisting of copper acetate, copper benzoate, copper(I) iodide, copper(II) iodide, basic copper carbonate, copper(I) chloride, copper(II) chloride, copper citrate, copper cyanide, ammonium copper(II) chloride, copper diphosphate, copper (I) fluoride, copper(II) fluoride, copper formate, copper gluconate, copper hydroxide, copper methanolate, copper nitrate, copper sulfate, copper tartrate, copper oxalate, copper(I) oxide, copper(II) oxide, copper nitride, copper phosphide, copper pyrophosphate, copper salicylate, copper stearate and copper bromide so as to make the molar ratio of lithium atom in the lithium compound:metal atom (nickel+copper) in the nickel compound and the copper compound 2.0:1.0 to 2.5:1.0 and to make the molar ratio of nickel atom in the nickel compound:copper atom in the copper compound 0.99:0.01 to 0.01:0.99 and then calcining in an inert gas atmosphere or in an atmosphere of mixed gases of oxygen and the inert gas.

The lithium nickel copper composite oxide of the present invention contains two lithium atoms per one metal atom in the crystal. If one of the lithium atoms is deserted from the crystal, still another lithium atom remains in the crystal and it can sufficiently hold the crystal structure. And in this case, only 50% of the lithium atoms is deserted from the crystal. Therefore, the change of the lattice volume itself is much smaller than the change of the lattice volume in the case that one lithium atom is deserted from the crystal of $LiCoO_2$ or the like. Therefore, the lithium nickel copper composite oxide can be provided as the positive electrode active material of the nonaqueous secondary battery having improved charge-discharge cycle life.

The lithium nickel copper composite oxide of the present invention can be provided as the positive electrode active material of the nonaqueous secondary battery having the capacity of about 250 mAh/g in the case that one of lithium atoms is deserted, or the capacity of about 500 mAh/g in the case that two of lithium atoms are deserted from the one composition. Namely, the lithium nickel copper composite oxide of the present invention can be provided as the positive electrode active material of the nonaqueous secondary battery having very large capacity.

Moreover, in the case of the lithium nickel copper composite oxide, relatively less expensive nickel and copper are used as the materials thereof, the material cost of the lithium nickel copper composite oxide of the present invention is lower than that of lithium cobalt composite oxide. Namely, in accordance with the present invention, there is provided the industrially valuable lithium nickel copper composite oxide and the novel nonaqueous secondary battery thereof.

EXAMPLES

In order to describe the present invention in detail, Examples according to the present invention will follow, but are not limited thereto and can be performed with modification which does not change the gist of the present invention.

Example 1

Samples were prepared by procedures hereinbelow. At first, $Li_2O$, NiO and CuO were weighed so as to make the molar ratio of lithium atom, nickel atom and copper atom (Li:Ni:Cu)=2.00:0.99:0.01, 2.00:0.75:0.25, 2.00:0.50:0.50, 2.00:0.25:0.75 and 2.00:0.01:0.99 and mixed in a mortar. The mixture was formed into pellets of 8 mm diameter and 3 mm thickness by applying hydraulic pressure of 150 kg/cm² thereto. These processes of weighing, mixing and pressure molding were performed in dry air whose humidity was below 1%.

Thus obtained pellets put on a ceramics boat was placed in an electric furnace and then nitrogen gas was introduced into the electric furnace. After full replacement of the atmosphere in the oven by nitrogen gas, the temperature in the electric furnace was raised from room temperature to 750° C. and the pellets were calcined at the constant temperature of 750° C. for 12 hours. During raising and maintaining the temperature, nitrogen gas was also passed through at the rate of 2 liter/min. After cooling the electric furnace to room temperature, the sample (calcined pellets) was taken out.

Figure 4:
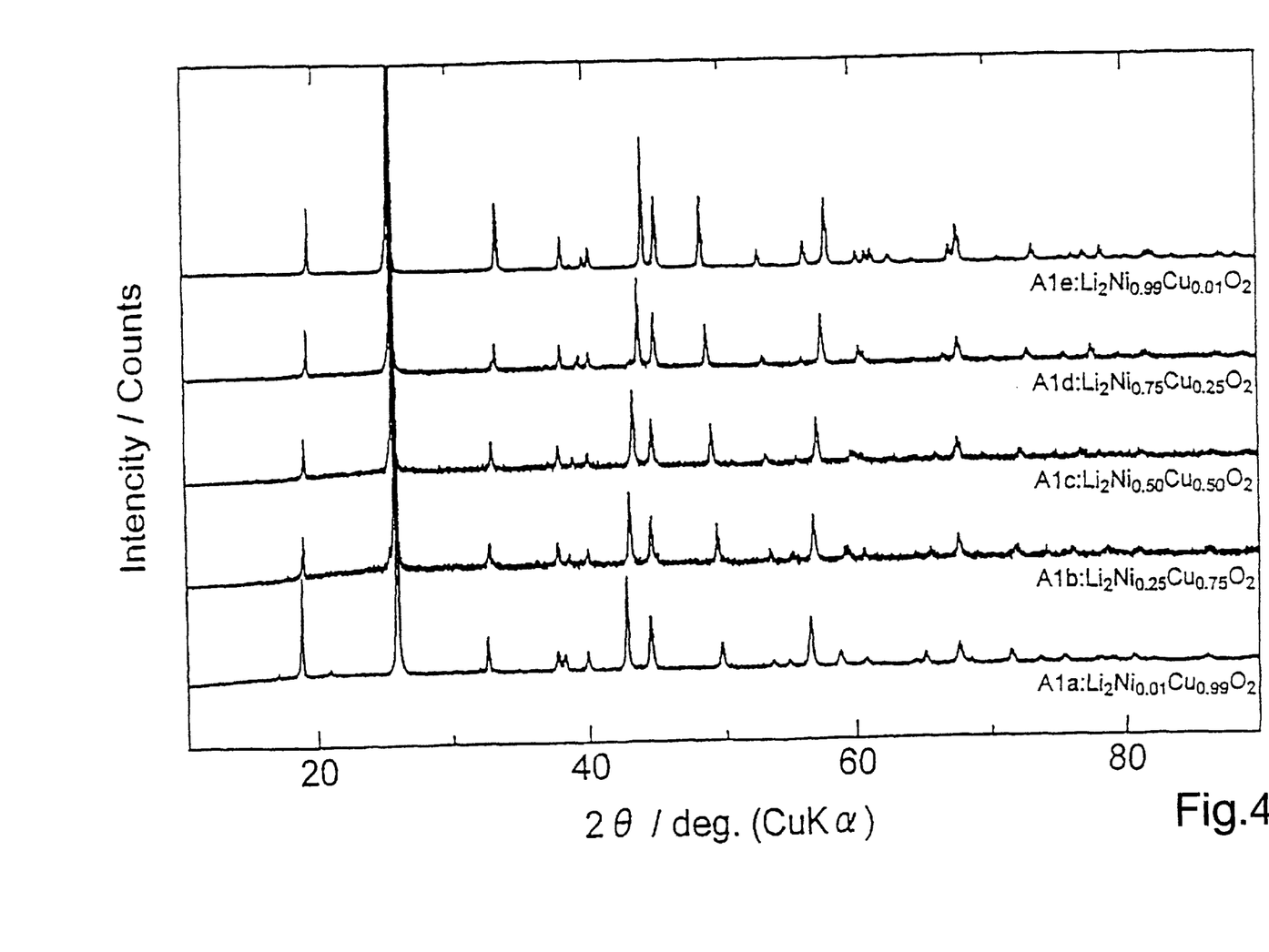
FIG. 4 shows a graphic representation showing X-ray diffraction patterns of samples A1a, A1b, A1c, A1d and A1e in accordance with Example 1 of the present invention.

The above-mentioned ratios of lithium atom, nickel atom and copper atom (Li:Ni:Cu)=2.00:0.99:0.01, 2.00:0.75:0.25, 2.00:0.50:0.50, 2.00:0.25:0.75 and 2.00:0.01:0.99 correspond in this order to samples A1a, A1b, A1c, A1d and A1e, respectively. The powder X-ray diffraction patterns of these samples are shown in FIG. 4. As X-ray source, CuKα-rays of 2 kW output were used from target Cu enclosed tube.

The X-ray diffraction pattern of each material had peaks with the diffraction angle 2θ being in the range between 18.5° and 20.0°, between 25.5° and 26.3°, between 32.0° and 34.0°, between 37.0° and 38.0°, between 38.0° and 40.0°, between 39.0° and 40.6°, between 42.0° and 44.6°, between 44.0° and 46.0°, and between 48.0° and 50.0°. According to the result of powder X-ray diffraction structure analyses, valent number analyses of nickel by iodometry method and elementary analyses by ICP, it was found that A1a was $Li_{2.00}Ni_{0.99}Cu_{0.01}O_2$, A1b was $Li_{2.00}Ni_{0.75}Cu_{0.25}O_2$, A1c was $Li_{2.00}Ni_{0.50}Cu_{0.50}O_2$, A1d was $Li_{2.00}Ni_{0.25}Cu_{0.75}O_2$ and A1e was $Li_{2.00}Ni_{0.01}Cu_{0.99}O_2$.

Example 2

Samples were prepared by using the same operations as in above-mentioned Example 1 except that the ratios of lithium atom, nickel atom and copper atom in the starting composition were (Li:Ni:Cu=) 2.50:0.99:0.01, 2.50:0.75:0.25, 2.50:0.50:0.50, 2.50:0.25:0.75 and 2.50:0.01:0.99. The above-mentioned ratios of lithium atom, nickel atom and copper atom (Li:Ni:Cu)=2.50:0.99:0.01, 2.50:0.75:0.25, 2.50:0.50:0.50, 2.50:0.25:0.75 and 2.50:0.01:0.99 correspond in this order to samples A2a, A2b, A2c, A2d and A2e, respectively. The X-ray diffraction analyses of these samples were carried out in the same manner as that in Example 1.

According to the result of powder X-ray diffraction structure analyses, valent number analyses of nickel by iodometry method and elementary analyses by ICP, it was found that A2a was $Li_{2.00}Ni_{0.99}Cu_{0.01}O_2$, A2b was $Li_{2.00}Ni_{0.75}Cu_{0.25}O_2$, A2c was $Li_{2.00}Ni_{0.50}Cu_{0.50}O_2$, A2d was $Li_{2.00}Ni_{0.25}Cu_{0.75}O_2$ and A2e was $Li_{2.00}Ni_{0.01}Cu_{0.99}O_2$.

Example 3

Samples were prepared by using the same operations as in above-mentioned Example 1 except that the calcination atmosphere was the mixed atmosphere of 5% of oxygen and 95% of nitrogen. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples A3a, A3b, A3c, A3d and A3e, respectively. The X-ray diffraction analyses of these sample were carried out in the same manner as that in Example 1.

According to the result of powder X-ray diffraction structure analyses, valent number analyses of nickel by iodometry method and elementary analyses by ICP, it was found that A3a was $Li_{2.00}Ni_{0.99}Cu_{0.01}O_2$, A3b was $Li_{2.00}Ni_{0.75}Cu_{0.25}O_2$, A3c was $Li_{2.00}Ni_{0.50}Cu_{0.50}O_2$, A3d was $Li_{2.00}Ni_{0.25}Cu_{0.75}O_2$ and A3e was $Li_{2.00}Ni_{0.01}Cu_{0.99}O_2$.

Example 4

Samples were prepared by using the same operations as in above-mentioned Example 1 except that the calcination temperature was 400° C. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples A4a, A4b, A4c, A4d and A4e, respectively. The powder of thus obtained samples was dark green. The X-ray diffraction analyses of these samples were carried out in the same manner as that in Example 1.

According to the result of powder X-ray diffraction structure analyses, valent number analyses of nickel by iodometry method and elementary analyses by ICP, it was found that A4a was $Li_{2.00}Ni_{0.99}Cu_{0.01}O_2$, A4b was $Li_{2.00}Ni_{0.75}Cu_{0.25}O_2$, A4c was $Li_{2.00}Ni_{0.50}Cu_{0.50}O_2$, A4d was $Li_{2.00}Ni_{0.25}Cu_{0.75}O_2$ and A4e was $Li_{2.00}Ni_{0.01}Cu_{0.99}O_2$.

Example 5

Samples were prepared by using the same operations as in above-mentioned Example 1 except that the calcination atmosphere was the atmosphere of argon gas. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples A5a, A5b, A5c, A5d and A5e, respectively. The powder of thus obtained samples was dark green. The X-ray diffraction analyses of these samples were carried out in the same manner as that in Example 1.

According to the result of powder X-ray diffraction structure analyses, valent number analyses of nickel by iodometry method and elementary analyses by ICP, it was found that A5a was $Li_{2.00}Ni_{0.99}Cu_{0.01}O_2$, A5b was $Li_{2.00}Ni_{0.75}Cu_{0.25}O_2$, A5c was $Li_{2.00}Ni_{0.50}Cu_{0.50}O_2$, A5d was $Li_{2.00}Ni_{0.25}Cu_{0.75}O_2$ and A5e was $Li_{2.00}Ni_{0.01}Cu_{0.99}O_2$.

Example 6

Samples were prepared by using the same operations as in above-mentioned Example 1 except that $Li_2O$, $Ni(OH)_2$ and $Cu(OH)_2$ were used as starting materials. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples A6a, A6b, A6c, A6d and A6e, respectively. The powder of thus obtained samples was dark green. The X-ray diffraction analyses of these samples were carried out in the same manner as that in Example 1.

According to the result of powder X-ray diffraction structure analyses, valent number analyses of nickel by iodometry method and elementary analyses by ICP, it was found that A6a was $Li_{2.00}Ni_{0.99}Cu_{0.01}O_2$, A6b was $Li_{2.00}Ni_{0.75}Cu_{0.25}O_2$, A6c was $Li_{2.00}Ni_{0.50}Cu_{0.50}O_2$, A6d was $Li_{2.00}Ni_{0.25}Cu_{0.75}O_2$ and A6e was $Li_{2.00}Ni_{0.01}Cu_{0.99}O_2$.

Example 7

Samples were prepared by using the same operations as in above-mentioned Example 1 except that the calcination time was one hour. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples A7a, A7b, A7c, A7d and A7e, respectively. The X-ray diffraction analyses of these samples were carried out in the same manner as that in Example 1.

According to the result of powder X-ray diffraction structure analyses, valent number analyses of nickel by iodometry method and elementary analyses by ICP, it was found that A7a was $Li_{2.00}Ni_{0.99}Cu_{0.01}O_2$, A7b was $Li_{2.00}Ni_{0.75}Cu_{0.25}O_2$, A7c was $Li_{2.00}Ni_{0.50}Cu_{0.50}O_2$, A7d was $Li_{2.00}Ni_{0.25}Cu_{0.75}O_2$ and A7e was $Li_{2.00}Ni_{0.01}Cu_{0.99}O_2$.

Comparative Example 1

Samples were prepared by using the same operations as in above-mentioned Example 1 except that the calcination atmosphere was the mixed atmosphere of 7.5% of oxygen and 92.5% of nitrogen. The above-mentioned ratios of lithium atom, nickel atom and copper atom (Li:Ni:Cu) in the starting composition=2.00:0.99:0.01, 2.00:0.75:0.25, 2.00:0.50:0.50, 2.00:0.25:0.75 and 2.00:0.01:0.99 correspond in this order to samples B1a, B1b, B1c, B1d and B1e, respectively. The X-ray diffraction analyses of these samples were carried out in the same manner as that in Example 1.

Figure 5:
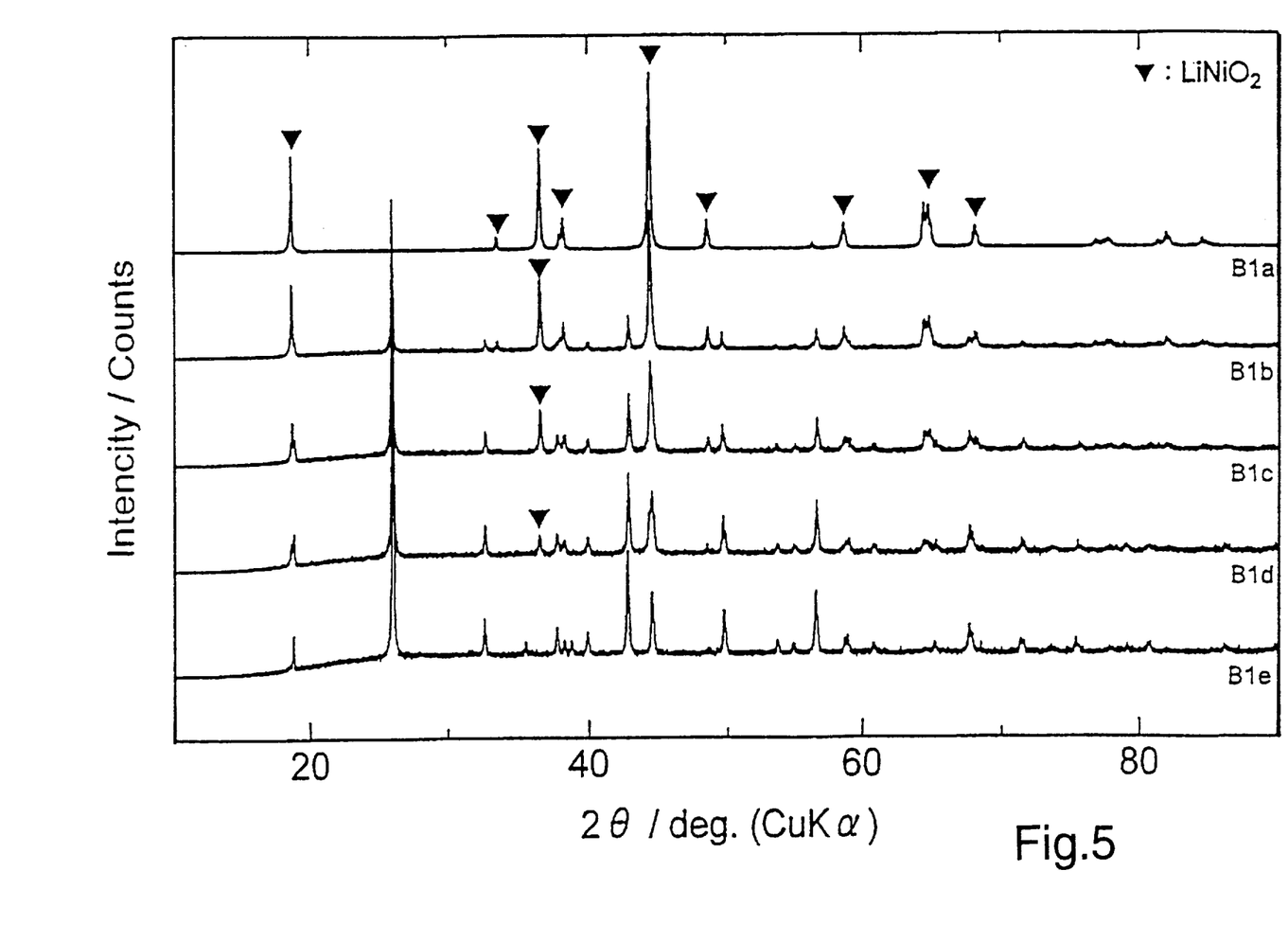
FIG. 5 shows a graphic representation showing X-ray diffraction patterns of samples B1a, B1b, B1c, B1d and B1e in accordance with Comparative Example 1.

The X-ray diffraction patterns of these samples are shown in FIG. 5. According to the result of powder X-ray diffraction structure analyses and elementary analyses by ICP, it was found that each of the samples B1a, B1b, B1c, B1d and B1e was a mixture of $Li_2CuO_2$ and $LiNiO_2$ like compound that have rock salt type structure.

Comparative Example 2

Samples were prepared by using by the same operations as in above-mentioned Example 1 except that the calcination temperature was 350° C. The above-mentioned ratios of lithium atom, nickel atom and copper atom in the starting composition (Li:Ni:Cu)=2.00:0.99:0.01, 2.00:0.75:0.25, 2.00:0.50:0.50, 2.00:0.25:0.75 and 2.00:0.01:0.99 correspond in this order to samples B2a, B2b, B2c, B2d and B2e, respectively. The X-ray diffraction analyses of these samples were carried out in the same manner as that in Example 1.

According to the result of powder X-ray diffraction structure analyses and elementary analyses by ICP, it was found that each of the samples B2a, B2b, B2c, B2d and B2e was a mixture containing two or more of the starting materials $Li_2O$, NiO and CuO.

Comparative Example 3

Samples were prepared by using the same operations as in above-mentioned Example 1 except that the calcination temperature was 800° C. The above-mentioned ratios of lithium atom, nickel atom and copper atom (Li:Ni:Cu) in the starting composition=2.00:0.99:0.01, 2.00:0.75:0.25, 2.00:0.50:0.50, 2.00:0.25:0.75 and 2.00:0.01:0.99 correspond in this order to samples B3a, B3b, B3c, B3d and B3e, respectively. The X-ray diffraction analyses of these samples were carried out in the same manner as that in Example 1.

Figure 6:
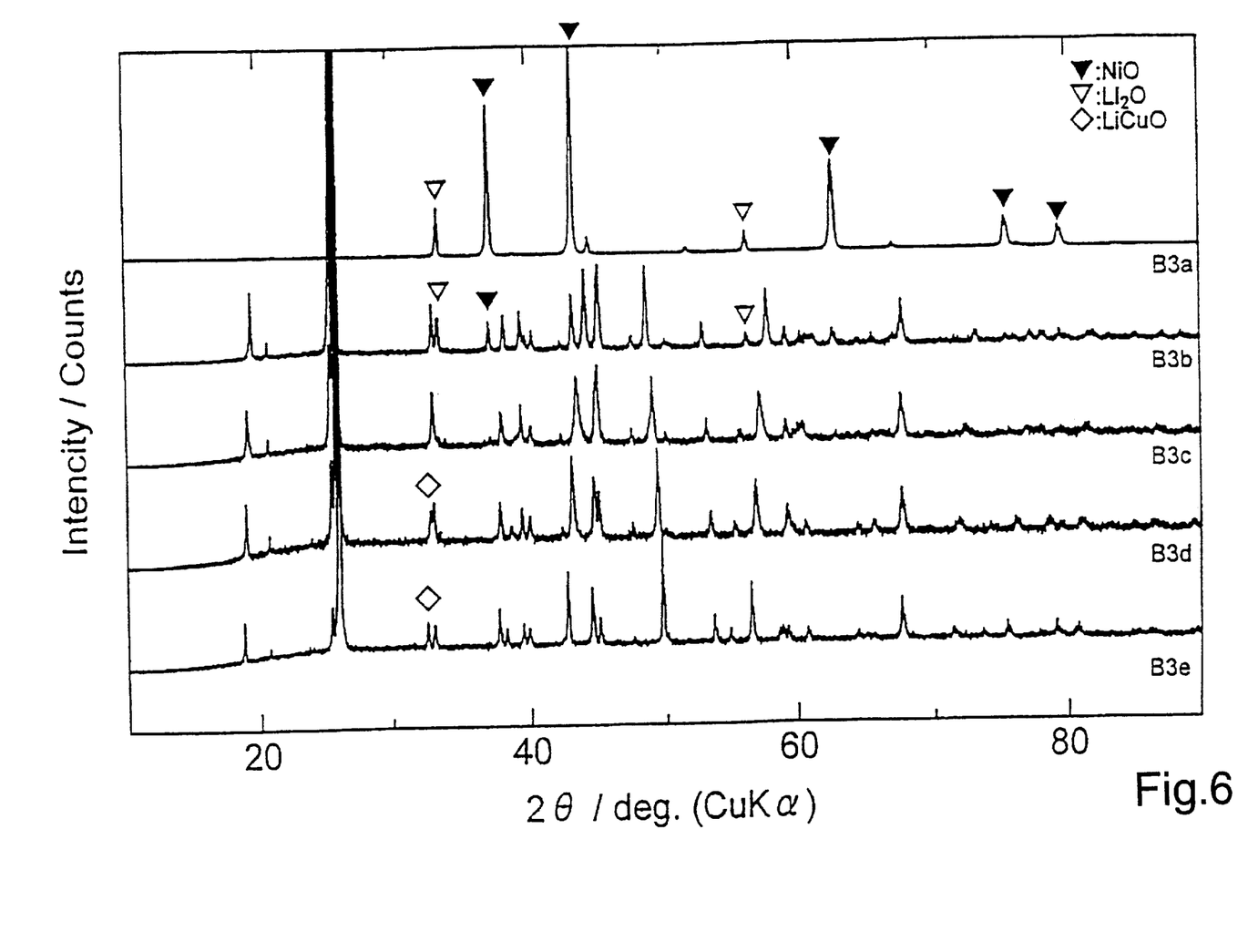
FIG. 6 shows a graphic representation showing X-ray diffraction patterns of samples B3a, B3b, B3c, B3d and B3e in accordance with Comparative Example 3.

The X-ray diffraction patterns of these samples are shown in FIG. 6. According to the result of powder X-ray diffraction structure analyses and elementary analyses by ICP, it was found that each of the samples B3a, B3b, B3c, B3d and B3e was a mixture of $Li_2CuO_2$ and starting material of $Li_2O$ and NiO.

Comparative Example 4

Samples were prepared by using the same operations as in above-mentioned Example 1 except that the ratio of lithium atom, nickel atom and copper atom in the starting composition were (Li:Ni:Cu=) 2.55:0.99:0.01, 2.55:0.75:0.25, 2.55:0.50:0.50, 2.55:0.25:0.75 and 2.55:0.01:0.99. The above-mentioned ratios of lithium atom, nickel atom and copper atom in the starting composition (Li:Ni:Cu)= 2.55:0.99:0.01, 2.55:0.75:0.25, 2.55:0.50:0.50, 2.55:0.25:0.75 and 2.55:0.01:0.99 correspond in this order to samples B4a, B4b, B4c, B4d and B4e, respectively. The X-ray diffraction analyses of these samples were carried out in the same manner as that in Example 1.

According to the result of powder X-ray diffraction structure analyses and elementary analyses by ICP, it was found that B4a was a mixture of $Li_{2.00}Ni_{0.99}Cu_{0.01}O_2$ and $Li_2O$, B4b was a mixture of $Li_{2.00}Ni_{0.75}Cu_{0.25}O_2$ and $Li_2O$, B4c was a mixture of $Li_{2.00}Ni_{0.50}Cu_{0.50}O_2$ and $Li_2O$, B4d was a mixture of $Li_{2.00}Ni_{0.25}Cu_{0.75}O_2$ and $Li_2O$ and B4e was a mixture of $Li_{2.00}Ni_{0.01}Cu_{0.99}O_2$ and $Li_2O$.

Comparative Example 5

Samples were prepared by using the same operations as in the preparation of the samples mentioned in Example 1 except that the ratio of lithium atom, nickel atom and copper atom in the starting composition were (Li:Ni:Cu=) 1.95:0.99:0.01, 1.95:0.75:0.25, 1.95:0.50:0.50, 1.95:0.25:0.75 and 1.95:0.01:0.99. The above-mentioned ratios of lithium atom, nickel atom and copper atom in the starting composition (Li:Ni:Cu)=1.95:0.99:0.01, 1.95:0.75:0.25, 1.95:0.50:0.50, 1.95:0.25:0.75 and 1.95:0.01:0.99 correspond in this order to samples B5a, B5b, B5c, B5d and B5e, respectively. The X-ray diffraction analyses of these samples were carried out in the same manner as that in Example 1.

According to the result of powder X-ray diffraction structure analyses and elementary analyses by ICP, it was found that B5a was a mixture of $Li_{2.00}Ni_{0.99}Cu_{0.01}O_2$ and NiO, B5b was a mixture of $Li_{2.00}Ni_{0.75}Cu_{0.25}O_2$ and NiO, B5c was a mixture of $Li_{2.00}Ni_{0.50}Cu_{0.50}O_2$ and NiO, B5d was a mixture of $Li_{2.00}Ni_{0.25}Cu_{0.75}O_2$ and NiO and B5e was a mixture of $Li_{2.00}Ni_{0.01}Cu_{0.99}O_2$ and CuO.

Comparative Example 6

Samples were prepared by using the same operations as in above-mentioned Example 6 except that the calcination time was one hour. The above-mentioned ratios of lithium atom, nickel atom and copper atom (Li:Ni:Cu)=2.00:0.99:0.01, 2.00:0.75:0.25, 2.00:0.50:0.50, 2.00:0.25:0.75 and 2.00:0.01:0.99 correspond in this order to samples B6a, B6b, B6c, B6d and B6e, respectively. The X-ray diffraction analyses of these samples were carried out in the same manner as that in Example 1.

According to the result of powder X-ray diffraction structure analyses, valent number analyses of nickel by iodometry method and elementary analyses by ICP, it was found that each of the samples B6a, B6b, B6c, B6d and B6e was a mixture of $Li_2O$, $Ni(OH)_2$ and $Cu(OH)_2$.

Phases of samples in Examples 1 to 7 and Comparative Examples 1 to 6 are shown in Table 1.

TABLE 1

| Example 1 | | Comparative Example 1 | |
|---|---|---|---|
| A1a | $Li_2Ni_{0.99}Cu_{0.01}O_2$ | B1a | $LiNiO_2$ |
| A1b | $Li_2Ni_{0.75}Cu_{0.25}O_2$ | B1b | $Li_2CuO_2 + LiNiO_2 + Li_2O$ |
| A1c | $Li_2Ni_{0.50}Cu_{0.50}O_2$ | B1c | $Li_2CuO_2 + LiNiO_2$ |
| A1d | $Li_2Ni_{0.25}Cu_{0.75}O_2$ | B1d | $Li_2CuO_2 + LiNiO_2$ |
| A1e | $Li_2Ni_{0.01}Cu_{0.99}O_2$ | B1e | $Li_2CuO_2$ |
| Example 2 | | Comparative Example 2 | |
| A2a | $Li_2Ni_{0.99}Cu_{0.01}O_2$ | B2a | $Li_2O + NiO$ |
| A2b | $Li_2Ni_{0.75}Cu_{0.25}O_2$ | B2b | $Li_2O + NiO + CuO$ |
| A2c | $Li_2Ni_{0.50}Cu_{0.50}O_2$ | B2c | $Li_2O + NiO + CuO$ |
| A2d | $Li_2Ni_{0.25}Cu_{0.75}O_2$ | B2d | $Li_2O + NiO + CuO$ |
| A2e | $Li_2Ni_{0.01}Cu_{0.99}O_2$ | B2e | $Li_2O + CuO$ |
| Example 3 | | Comparative Example 3 | |
| A3a | $Li_2Ni_{0.99}Cu_{0.01}O_2$ | B3a | $Li_2O + NiO$ |
| A3b | $Li_2Ni_{0.75}Cu_{0.25}O_2$ | B3b | $Li_2CuO_2 + NiO + Li_2O$ |
| A3c | $Li_2Ni_{0.50}Cu_{0.50}O_2$ | B3c | $Li_2CuO_2 + LiNiO_2$ |
| A3d | $Li_2Ni_{0.25}Cu_{0.75}O_2$ | B3d | $Li_2CuO_2 + LiCuO$ |
| A3e | $Li_2Ni_{0.01}Cu_{0.99}O_2$ | B3e | $Li_2CuO_2 + LiCuO$ |
| Example 4 | | Comparative Example 4 | |
| A4a | $Li_2Ni_{0.99}Cu_{0.01}O_2$ | B4a | $Li_2Ni_{0.99}Cu_{0.01}O_2 + Li_2O$ |
| A4b | $Li_2Ni_{0.75}Cu_{0.25}O_2$ | B4b | $Li_2Ni_{0.75}Cu_{0.25}O_2 + Li_2O$ |
| A4c | $Li_2Ni_{0.50}Cu_{0.50}O_2$ | B4c | $Li_2Ni_{0.50}Cu_{0.50}O_2 + Li_2O$ |
| A4d | $Li_2Ni_{0.25}Cu_{0.75}O_2$ | B4d | $Li_2Ni_{0.25}Cu_{0.75}O_2 + Li_2O$ |
| A4e | $Li_2Ni_{0.01}Cu_{0.99}O_2$ | B4e | $Li_2Ni_{0.01}Cu_{0.99}O_2 + Li_2O$ |
| Example 5 | | Comparative Example 5 | |
| A5a | $Li_2Ni_{0.99}Cu_{0.01}O_2$ | B5a | $Li_2Ni_{0.99}Cu_{0.01}O_2 + NiO$ |
| A5b | $Li_2Ni_{0.75}Cu_{0.25}O_2$ | B5b | $Li_2Ni_{0.75}Cu_{0.25}O_2 + NiO$ |
| A5c | $Li_2Ni_{0.50}Cu_{0.50}O_2$ | B5c | $Li_2Ni_{0.50}Cu_{0.50}O_2 + NiO$ |
| A5d | $Li_2Ni_{0.25}Cu_{0.75}O_2$ | B5d | $Li_2Ni_{0.25}Cu_{0.75}O_2 + NiO$ |
| A5e | $Li_2Ni_{0.01}Cu_{0.99}O_2$ | B5e | $Li_2Ni_{0.01}Cu_{0.99}O_2 + CuO$ |
| Example 6 | | Comparative Example 6 | |
| A6a | $Li_2Ni_{0.99}Cu_{0.01}O_2$ | B6a | $Li_2O + Ni(OH)_2 + Cu(OH)_2$ |
| A6b | $Li_2Ni_{0.75}Cu_{0.25}O_2$ | B6b | $Li_2O + Ni(OH)_2 + Cu(OH)_2$ |
| A6c | $Li_2Ni_{0.50}Cu_{0.50}O_2$ | B6c | $Li_2O + Ni(OH)_2 + Cu(OH)_2$ |
| A6d | $Li_2Ni_{0.25}Cu_{0.75}O_2$ | B6d | $Li_2O + Ni(OH)_2 + Cu(OH)_2$ |
| A6e | $Li_2Ni_{0.01}Cu_{0.99}O_2$ | B6e | $Li_2O + Ni(OH)_2 + Cu(OH)_2$ |
| Example 7 | | | |
| A7a | $Li_2Ni_{0.99}Cu_{0.01}O_2$ | | |
| A7b | $Li_2Ni_{0.75}Cu_{0.25}O_2$ | | |
| A7c | $Li_2Ni_{0.50}Cu_{0.50}O_2$ | | |
| A7d | $Li_2Ni_{0.25}Cu_{0.75}O_2$ | | |
| A7e | $Li_2Ni_{0.01}Cu_{0.99}O_2$ | | |

Example 8

Figure 7:
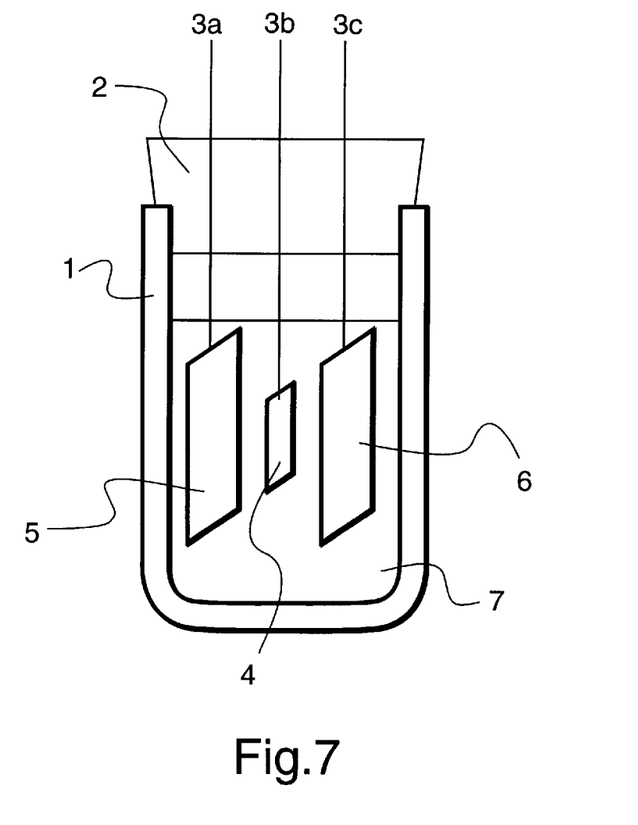
FIG. 7 shows a schematic illustration of a three-electrode-type battery in accordance with Example 8 of the present invention.

FIG. 7 shows the schematic illustration of the three-electrode-type battery in accordance with one aspect of the present invention. In FIG. 7, reference numeral 1 represents a glass cell, 2 represents a cap, each of 3a, 3b and 3c represents a lead, 5 represents a positive electrode, 6 represents a negative electrode, 4 represents a counter electrode and 7 represents an liquid electrolyte. The positive electrode 5 was connected to the lead 3a and the negative electrode 6 was connected to the lead 3c. The chemical energy generated inside the battery could be taken out from the ends of leads 3a and 3c as the electrical energy.

One of the samples A1a, A1b, A1c, A1d and A1e was ground in the mortar, mixed with about 10 wt % of acetylene black as the electron conducting material followed by mixing with about 10 wt % of Teflon resin powder as the binder. The mixture was molded with pressure in the tablet molder and formed into the pellets. The positive electrode 5 was prepared by contact-bonding the pellets to the metal mesh.

As the negative electrode 6 and the counter electrode 4, used was the nickel mesh on which the metallic lithium sheet was contact-bonded was used. Used as the liquid electrolyte 7 was the solution in which 1 mol/liter of lithium perchlorate ($LiClO_4$) was dissolved in the solvent mixture containing 50 vol % of ethylene carbonate and 50 vol % of diethylene carbonate. The battery was fabricated by putting these positive electrode 4, negative electrode 6, counter electrode 4 and liquid electrolyte 7 into the glass cell 1 as shown in FIG. 7 and the charge-discharge test of the resulting battery was performed. All these processes were carried out in the glove box filled with argon gas.

The charge-discharge test of the battery thus constituted was performed at the constant current in the range of 1.5 V to 4.2 V. For all samples A1a to A1e, the above-mentioned tests were performed. Table 2 shows the charge capacities and discharge capacities of the samples in the first cycle. The charge capacity of the first charge for the electrode using the sample A1a as the positive electrode active material was about 384 mAh/g. And the capacity of the first discharge for that electrode was about 368 mAh/g. The capacity of the first charge corresponded to the fact that about 1.5 of lithium atoms were deserted from the crystal of $Li_2Ni_{1-x}Cu_xO_2$ (0.0<X<1.0) during the charge and the capacity of the first discharge corresponded to the fact that about 1.4 of lithium atoms were returned into the crystal of $Li_2Ni_{1-x}Cu_xO_2$ (0.0<X<1.0) during the discharge. Namely, it was also found that charge and discharge efficiency was very high.

Example 9

One of the samples A1a, A1b, A1c, A1d and A1e was ground in the mortar, mixed with about 1 wt % of acetylene black as the conductive material followed by mixing with about 50 wt % of Teflon resin powder as the binder. The mixture was molded with pressure in a tablet molder and formed into pellets. The positive electrode 5 was prepared by contact-bonding the pellets to a metal mesh.

Natural graphite was mixed with about 10 wt % of polyvinylidene fluoride followed by adding N-methyl-2-pyrrolidone as the solvent to form the paste of slurry state. As the negative electrode 6, was used the metal copper foil on which this slurry was spread, dried and compressed. As the reference electrode 4, was used the nickel mesh on which the metallic lithium sheet was contact-bonded. Used as the liquid electrolyte 7 was the solution in which 1 mol/liter of lithium phosphofluoride ($LiPF_6$) was dissolved in the solvent mixture containing 50 vol % of propylene carbonate and 50 vol % of tetrahydrofuran.

The battery was fabricated by putting these positive electrode 5, negative electrode 6 and liquid electrolyte 7 into the same glass cell 1 as in Example 8 and the charge-discharge test of the resulting battery was performed. For all samples A1a to A1e, the above-mentioned tests were performed. Table 3 shows the charge capacities and discharge capacities of the samples in the first cycle. It was found that the batteries in accordance with Example 9 and these in the accordance with Example 8 showed almost the same results, which meant that the battery had great capacity and large charge and discharge efficiency.

Example 10

Figure 8:
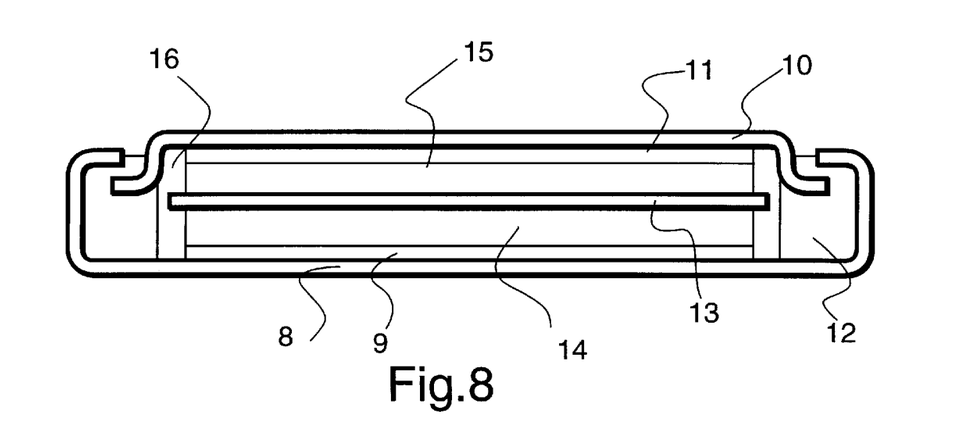
FIG. 8 shows a schematic illustration of a coin-type battery in accordance with Example 10 of the present invention.

FIG. 8 shows the schematic illustration of the coin-type battery in accordance with the present invention. In FIG. 8, reference numeral 8 represents a positive electrode can, 9 represents a positive electrode collector, 14 represents a positive electrode, 10 represents a negative electrode can, 11 represents a negative electrode collector, 15 represents a negative electrode, 12 represents a packing and 13 represents a separator. The positive electrode 14 and the negative electrode 15 were placed inside the coin-type cell constituted with the positive electrode can 8 and the negative electrode can 10 facing each other, with the separator 13 disposed in between impregnated with the liquid electrolyte.

Accordingly, the positive electrode 14 was connected to the positive electrode can 8 via the positive electrode collector 9, and the negative electrode 15 was connected to the negative electrode can 10 via the negative electrode collector 11. The chemical energy generated inside the battery could be taken out from the ends of the positive electrode can 8 and the negative electrode can 10 as the electrical energy.

One of the samples A1a, A1b, A1c, A1d and A1e was ground in the mortar, mixed with about 50 wt % of acetylene black as the conductive material followed by mixing with about 1 wt % of Teflon resin powder as the binder. The mixture was molded with pressure in the tablet molder and formed into pellets. The positive electrode 14 was prepared by contact-bonding the pellets to the metal mesh.

Carbon material which was derived from pitch by thermolysis in the inert gas atmosphere was mixed with about 1 wt % of Teflon resin powder as the binder. As the negative electrode 15, were used pellets formed from the mixture by molding with pressure in the tablet molder. Used as the liquid electrolyte was the solution in which 0.5 mol/liter of lithium phosphofluoride ($LiPF_6$) was dissolved in the solvent mixture containing 10 vol % of propylene carbonate and 90 vol % of tetrahydrofuran.

The coin-type battery was fabricated by putting these positive electrode 14, negative electrode 15 and electrolytic solution 16 into the coin-type cell as shown in FIG. 8 and charge-discharge tests of the resulting coin-type battery were performed. For all samples A1a to A1e, the above-mentioned tests were performed. All processes were carried out in a glove box filled with argon gas. Table 4 shows the charge capacities and discharge capacities of the samples in the first cycle. The batteries in accordance with Example 10 and these in accordance with Example 8 showed almost the same results, which meant that the batteries had large capacities and high charge-discharge efficiencies.

Comparative Example 7

The battery was prepared in substantially the same manner as in Example 8 except that $LiNiO_2$ was used for the positive electrode active material and charging-discharging test of the battery was performed at the constant current. $LiNiO_2$ was prepared by mixing LiOH and NiO well and calcining the mixture thereof in the oxygen atmosphere for 12 hours at 750° C. X-ray diffraction analysis of thus obtained sample was performed in the same manner as in Example 1.

According to the result of powder X-ray diffraction analysis and elementary analysis by ICP, it was found that the obtained $LiNiO_2$ was substantially identical with that of known $LiNiO_2$ cited in JPCDS card 9-63. Table 5 shows the charge capacity, the discharge capacity and the charge and discharge efficiency of this cell (the battery using the obtained $LiNiO_2$) in the first cycle. As is apparent from the comparison between Tables 2 and 5, it is found that the battery using $Li_2Ni_{1-x}Cu_xO_2$ (X=0.01, 0.25, 0.50, 0.75, 0.99) of the present invention has larger capacity than that using conventional $LiNiO_2$.

TABLE 2

|  | charge capacity (mAh/g) | discharge capacity (mAh/g) | efficiency (%) |
| --- | --- | --- | --- |
| A1a | 384.6 | 368.1 | 95.7 |
| A1b | 312.6 | 288.4 | 92.3 |
| A1c | 306.0 | 288.2 | 94.2 |
| A1d | 299.8 | 273.6 | 91.3 |
| A1e | 293.4 | 259.0 | 88.3 |

TABLE 3

|  | charge capacity (mAh/g) | discharge capacity (mAh/g) | efficiency (%) |
| --- | --- | --- | --- |
| A1a | 295.4 | 290.3 | 98.3 |
| A1b | 290.7 | 289.9 | 99.7 |
| A1c | 281.0 | 275.5 | 98.0 |
| A1d | 278.2 | 273.0 | 98.1 |
| A1e | 265.6 | 260.3 | 98.0 |

TABLE 4

|  | charge capacity (mAh/g) | discharge capacity (mAh/g) | efficiency (%) |
| --- | --- | --- | --- |
| A1a | 353.4 | 350.6 | 99.2 |
| A1b | 351.6 | 348.6 | 99.1 |
| A1c | 349.8 | 346.3 | 99.0 |
| A1d | 347.0 | 343.3 | 98.9 |
| A1e | 343.4 | 338.9 | 98.7 |

TABLE 5

|  | charge capacity (mAh/g) | discharge capacity (mAh/g) | efficiency (%) |
| --- | --- | --- | --- |
| $LiNiO_2$ | 165.5 | 140.7 | 85.1 |

According to the present invention, the novel compound $Li_2Ni_{1-x}Cu_xO_2$ (0.0<X<1.0) which is derived from nickel, a less expensive material, can be prepared. Moreover, when the nonaqueous secondary battery is fabricated by using this compound as the positive electrode active material, it is possible to provide the nonaqueous secondary battery which has larger capacity and higher charging-discharging efficiency in the first cycle than the nonaqueous secondary battery using the conventional $LiNiO_2$.

What is claimed is:

1. A lithium nickel copper composite oxide having the compositional formula of $Li_2Ni_{1-x}Cu_xO_2$ (0.0<X<1.0).

2. A lithium nickel copper composite oxide according to claim 1, wherein the composite oxide comprises (Ni—Cu)$O_4$ square planar coordination units share their opposite sides to form a linear chain which is located parallel to another linear chain of (Ni—Cu)$O_4$ square planer coordination units with their planes facing opposite to each other.

3. A lithium nickel copper composite oxide according to claim 1, wherein the composite oxide has the structure belonging to a space group I mmm.

4. A process of preparing lithium nickel copper composite oxide having the compositional formula $Li_2Ni_{1-x}Cu_xO_2$ (0.0<X<1.0), comprising the steps of:

mixing a lithium compound selected from the group consisting of metallic lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate, a nickel compound selected from the group consisting of nickel acetate, nickel amidosulfate, ammonium nickel(II) sulfate (hexahydrate), nickel benzoate, nickel bromide, basic nickel carbonate, nickel carbonyl compound, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel(II) oxide, dinickel trioxide, nickel perchlorate, nickel phosphate, nickel phosphinate, nickel pyrophosphate, nickel stearate, nickel sulfate, nickel sulfide, nickel tartrate and metal nickel, and a copper compound selected from the group consisting of copper acetate, copper benzoate, copper (I) iodide, copper(II) iodide, basic copper carbonate, copper(I) chloride, copper(II) chloride, copper citrate, copper cyanide, ammonium copper(II) chloride, copper diphosphate, copper(I) fluoride, copper(II) fluoride, copper formate, copper gluconate, copper hydroxide, copper methanolate copper nitrate, copper sulfate, copper tartrate, copper oxalate, copper(I) oxide, copper(II) oxide, copper nitride, copper phosphide, copper pyrophosphate, copper salicylate, copper stearate and copper bromide; and calcining in the atmosphere of mixed gases of oxygen and the inert gas, thereby forming the lithium nickel copper composite oxide.

5. A process according to claim 4, wherein the molar ratio of lithium atom in the lithium compound:metal atom (nickel and copper) in the metal materials (aforesaid nickel compound and copper compound) is in the range between 2.0:1.0 and 2.5:1.0.

6. A process according to claim 4, wherein the molar ratio of nickel atom in the nickel compound:copper atom in the copper compound is in the range between 0.99:0.01 and 0.01:0.99.

7. A process according to claim 4, wherein the nickel compound is nickel oxide (NiO) and the copper compound is copper oxide (CuO).

8. A process according to claim 4, wherein the partial pressure of oxygen in the atmosphere of mixed gases of oxygen and the inert gas is in the range between 0.0% and 5.0% of the total pressure.

9. A process according to claim 4, wherein the calcination temperature is in the range between 400° C. and 750° C.

10. A positive electrode active material comprising the lithium nickel copper composite oxide having the compositional formula $Li_2Ni_{1-X}Cu_XO_2$ (0.0<X<1.0).

11. A nonaqueous secondary battery comprising a positive electrode of a lithium nickel copper composite oxide having the compositional formula $Li_2Ni_{1-X}Cu_XO_2$ (0.0<X<1.0) as the positive electrode active material, a negative electrode having metallic lithium or lithium intercalation/deintercalation material as a negative electrode active material and an ion-conductive material.

* * * * *